April 18, 1967 H. L. McCORMICK 3,314,650
COOLED BLADE
Filed July 20, 1965

INVENTOR.
Hamilton L. McCormick DECEASED
Signe M. McCormick-EXECUTRIX
BY
Paul Fitzpatrick
ATTORNEY

United States Patent Office 3,314,650
Patented Apr. 18, 1967

3,314,650
COOLED BLADE
Hamilton L. McCormick, deceased, late of Carmel, Ind., by Signe M. McCormick, executrix, Carmel, Ind., assignor to General Motors Corporation, a corporation of Delaware
Filed July 20, 1965, Ser. No. 473,531
10 Claims. (Cl. 253—39.15)

This invention relates generally to turbine blades and the like and more specifically to cooled turbine blades which are subjected to hot gases when used in turbomachinery.

The most critical factor limiting the power output of today's gas turbines is that of the turbine inlet temperature. While present day technology is capable of producing higher turbine inlet temperatures for increased power, the turbine blade technology has not kept pace with the result that the temperature which the turbine blade is able to withstand is the factor limiting power output.

One way to increase the power output limit is to operate the turbine at elevated temperatures while cooling the blades to temperatures within present day metallurgical limits. Among the methods of blade cooling utilized have been the provision of a radial path through the blade for the flow of cool air bled from the compressor discharge. This method has met with some success; however, it has some drawbacks. Among the disadvantages of this method of cooling is the inability to adequately cool the hot spots which occur in a turbine blade. These hot spots are usually located at the leading edge and sometimes at the trailing edge of the blade. In addition, the air flow in these areas is generally less than through the thicker central portion of the blade. Previous attempts at alleviating this air cooling problem have included the use of impingement cooling or of a closed chamber filled with a liquid metal near the leading edge or other critical area of the blade to increase the amount of heat transferred from the critical area. In the latter case, the heat is then delivered by the liquid metal to the blade root where it is transferred to compressor bleed air. None of the blade cooling designs presently available, however, are entirely satisfactory.

Heretofore, no attempt has been made so far as I am aware to combine these two blade cooling concepts, the radial air flow and the liquid metal chamber completely into an integrated system to maximize the heat transfer from the blade. Accordingly, this invention is directed toward providing a cooled blade having the radial air flow and liquid metal chamber concepts integrated into a single system to provide maximum blade cooling.

Another object is to provide a cooled blade wherein the entire surface area of the blade is maintained at a substantially constant temperature to provide maximum blade cooling.

Another object is to provide a cooled blade having a liquid metal cooling system to cool the entire surface area of the blade and a radial flow air cooling system in juxtaposition to the liquid metal system to provide maximum blade cooling.

The exact nature of this invention as well as other objects and advantages thereof will be readily apparent from consideration of the following specification relating to the annexed drawings in which.

Figure 1:
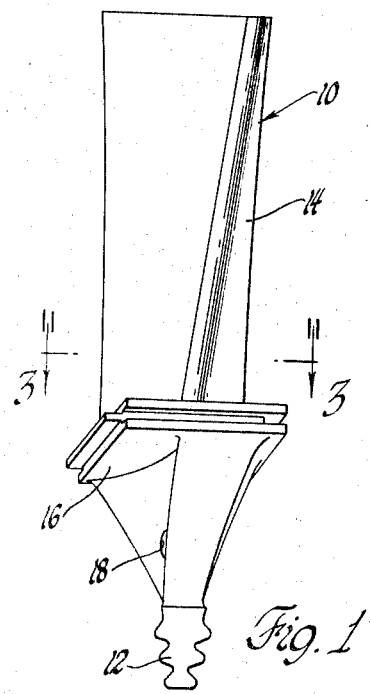
FIGURE 1 is a frontal view of a turbine blade in accordance with the invention.
Figure 3:
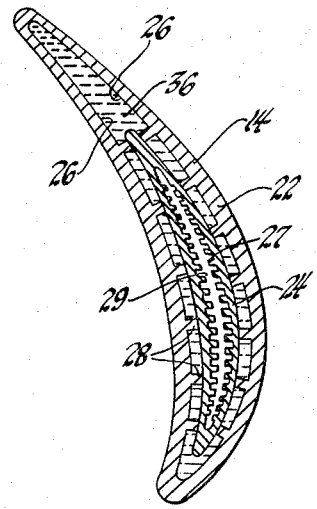
FIGURE 3 is a sectional view taken substantially along the line 3—3 of FIGURE 1 and looking in the direction of the arrows.
Figure 2:
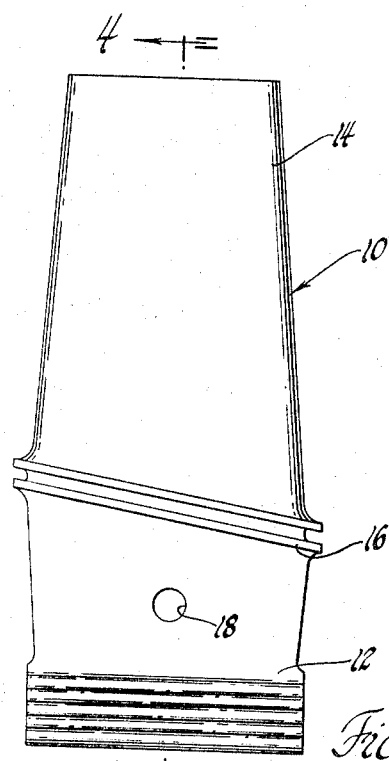
FIGURE 2 is a side view of a turbine blade in accordance with the invention.
Figure 4:
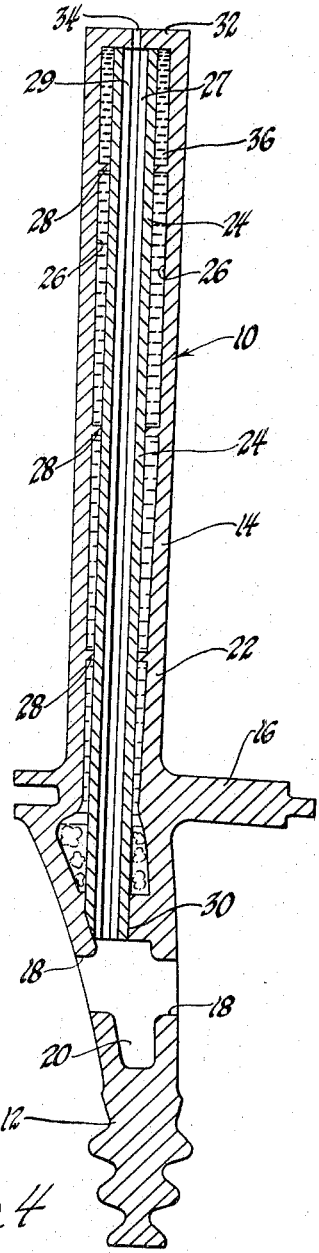
FIGURE 4 is a sectional view taken substantially along the line 4—4 of FIGURE 2 and looking in the direction of the arrows.

More specifically, FIGURES 1 and 2 show a turbine blade indicated generally at 10 comprising a conventional fir tree root section 12 and an airfoil section 14 with a blade platform 16 therebetween. An inlet 18 provided in the root section 12 leads to a cavity 20 as can more easily be seen in FIGURE 4. Also, as is evident from FIGURE 4, the airfoil section 14 actually comprises a sheath 22 which extends from the platform 16. Disposed centrally within the airfoil sheath 22 is an insert 24. The insert 24 is located centrally within the sheath 22 by a number of pedestals 28 which extend from the inner walls 26 of the sheath 22 and abut the outer surface of the insert 24. The inner surface 27 of the insert 24 is grooved to form a castellated cross section. The grooving increases the area of the inner surface 27 and thus the amount of heat transferred to the air flowing through the passage 29 defined thereby.

Spanwise, the insert 24 extends from passage 30 in the root portion 12 to the tip 32 of the airfoil portion 14. The tip 32 has an outlet 34 which communicates with passage 29 to establish an air path spanwise through the blade 10. More specifically, this path for the flow of cooling air bled from the compressor discharge comprises inlet 18, cavity 20, passages 29 and 30, and outlet 34.

The insert 24 is made from a high heat transfer low density material such as beryllium. The external sheath is made from a castable alloy such as Inco–713 so that the sheath 22 may be cast around the insert 24. Inco–713 is a metallic composition consisting of the following elements in the following proportions: Carbon 0.20 to maximum, manganese 1.0 to maximum, sulfur 0.015 to maximum, silicon 1.0 to maximum, chromium 11.0 to 14.0, molybdenum 3.5 to 5.5, titanium 0.25 to 1.25, aluminum 5.5 to 6.5, iron 5.0 to maximum, columbium + tantalum 1.0 to 3.0, nickel remainder.

The insert 24 also forms a closed chamber 36 with the inner walls 26 of the sheath 22. The chamber 36 is substantially filled with a liquid metal such as sodium. The chamber 36 may also contain argon or another inert gas to provide an expansion space for the sodium as the temperature of the sheath 22 increases.

In operation, when the blade 10 is in a hot gaseous environment, heat is transferred from the sheath 22 to the liquid metal sodium in the chamber 36. The liquid metal sodium serves two functions. It distributes the heat throughout the outer sheath 22 because of the natural convection flow of the liquid metal sodium both spanwise and chordwise. In other words, the hot spots are removed and the entire surface area of the sheath 22 is at a substantially constant temperature. Secondly, the liquid metal transfers the heat from the sheath 22 to the insert 24 which in turn transfers the heat to the air flowing through pasage 29 defined by the inner surface 27 of the insert 24. The insert 24 may have the same or a higher thermal conductivity as the sheath 22. When the thermal conductivity of the insert 24 is substantially higher than that of the sheath 22, the temperature of the sheath 22 is maintained at a lower level because heat is transferred to the cooling air passing through the passage 27 at a faster rate.

Thus, it can be seen that the invention provides a cooled blade having a liquid metal cooling system to cool the entire surface area of the blade and maintain it at a substantially constant temperature and an air cooling system in a parallel flow relationship to the liquid metal system to provide a single integrated system for maximum blade cooling.

It should be understood, of course, that the foregoing disclosure relates to only a preferred embodiment of the invention and that numerous modifications or alterations may be made therein without departing from the spirit and scope of the invention as set forth in the appended claims.

What is claimed is:
1. In a blade used in turbomachinery and subjected to hot gases, the combination comprising:
   a blade root having a cavity, said cavity having inlet and outlet means,
   an airfoil sheath extending from said root and terminating in a tip,
   a cylinder disposed in said airfoil sheath extending from said outlet means to said tip to form a closed chamber between said cylinder and substantially the entire inner periphery of said sheath,
   second outlet means in said airfoil in communication with the inside of said cylinder whereby a path is provided from said inlet means to said secoond outlet means through said cavity and said cylinder for the flow of a first heat exchange medium, and
   a second heat exchange medium in said chamber whereby heat is transferred from said airfoil to said second heat exchange medium to said cylinder to said first heat exchange medium flowing therethrough to cool said blade.

2. The combination as defined in claim 1 wherein said hollow insert is of substantially duplicate contour as said airfoil and is centrally disposed therein.

3. The combination as defined in claim 1 wherein said cylinder is of higher thermal conductivity than said sheath.

4. The combination as defined in claim 2 wherein said cylinder is of higher thermal conductivity than said sheath.

5. The combination as defined in claim 1 wherein said second heat transfer medium is a liquid metal.

6. The combination as defined in claim 2 wherein said second heat transfer medium is a liquid metal.

7. The combination as defined in claim 1 wherein said cylinder is of higher thermal conductivity than said sheath and said second heat transfer medium is a liquid metal.

8. The combination as defined in claim 2 wherein said cylinder is of higher thermal conductivity than said sheath and said second heat transfer medium is a liquid metal.

9. In a blade used in turbomachinery and subjected to hot gases, the combination comprising:
   a blade root having a cavity, said cavity having inlet and outlet means,
   an airfoil sheath of substantially uniform thickness extending from said root and terminating in a tip, second outlet means in said tip,
   a hollow thermally conductive cylinder of substantially identical contour to said airfoil sheath disposed centrally within said sheath and spaced chordwise therefrom by a plurality of pedestals extending between the inner surface of said sheath and the outer surface of said cylinder, said insert extending from said base to said tip to form a closed passage between said first and second outlet means and to define a closed chamber with substantially the entire inner surface of said sheath, said chamber being substantially filled with a liquid metal whereby heat is transferred from said blade to said liquid metal to said cylinder to a cooling medium flowing through said blade from said inlet means to said second outlet means to cool said blade.

10. The combination as defined in claim 9 wherein the inner surface of said cylinder is grooved to increase the heat transfer area.

References Cited by the Examiner

UNITED STATES PATENTS

| 2,501,038 | 3/1950 | Fransson | 253—77 |
| 2,648,520 | 8/1953 | Schmitt | 253—77 |
| 2,650,803 | 9/1953 | Rosskopp | 253—39.15 |
| 2,699,917 | 1/1955 | Colwell | 253—39.15 |
| 3,164,367 | 1/1965 | Lynch | 253—39.15 |

FOREIGN PATENTS 610,737    10/1948    Great Britain.

MARTIN P. SCHWADRON, *Primary Examiner.*
EVERETTE A. POWELL, JR., *Examiner.*